United States Patent [19]
Vanderlans

[11] Patent Number: 4,964,439
[45] Date of Patent: Oct. 23, 1990

[54] PIPE PLUG WITH CIRCUMFERENTIAL SUCTION CUPS

[76] Inventor: Gerald J. Vanderlans, 1310 W. Turner Rd., Lodi, Calif. 95240

[21] Appl. No.: 339,684

[22] Filed: Apr. 18, 1989

[51] Int. Cl.⁵ .............................................. F16L 55/12
[52] U.S. Cl. ........................................ 138/93; 138/89
[58] Field of Search ........................ 138/89, 93; 383/3

[56] References Cited

U.S. PATENT DOCUMENTS

| | | | |
|---|---|---|---|
| 2,156,260 | 5/1939 | Crothers | 138/93 |
| 3,190,679 | 6/1965 | Lester | 138/93 |
| 3,870,085 | 3/1975 | Schreider | 138/93 |
| 4,417,598 | 11/1983 | De Pirro | 138/93 |
| 4,660,603 | 4/1987 | Tash | 138/93 |
| 4,660,644 | 4/1987 | Egnor | 138/93 |

*Primary Examiner*—James E. Bryant, III
*Attorney, Agent, or Firm*—Owen, Wickersham & Erickson

[57] ABSTRACT

A tubular all-rubber member has one end closed and an end through which air may be pumped into it. A tubular end portion of the member has a series of plug body portions alternating with a series of pairs of flexible inclined ribs that are thin at their outer ends and join a plug body portion at a thicker inner end portion. Between each pair of ribs lies a concave expandable ring that normally lies radially within the plug body. Each rib lies at about 10° to its adjoining body portion so that it faces away from the concave ring, so that when the plug is installed into a sewer pipe, it is freely movable inside the pipe to a desired position and can then be pneumatically expanded so that the concave rings expand and grip the pipe wall surfaces and the thin angular ribs move to grip both the plug and the pipe.

6 Claims, 2 Drawing Sheets

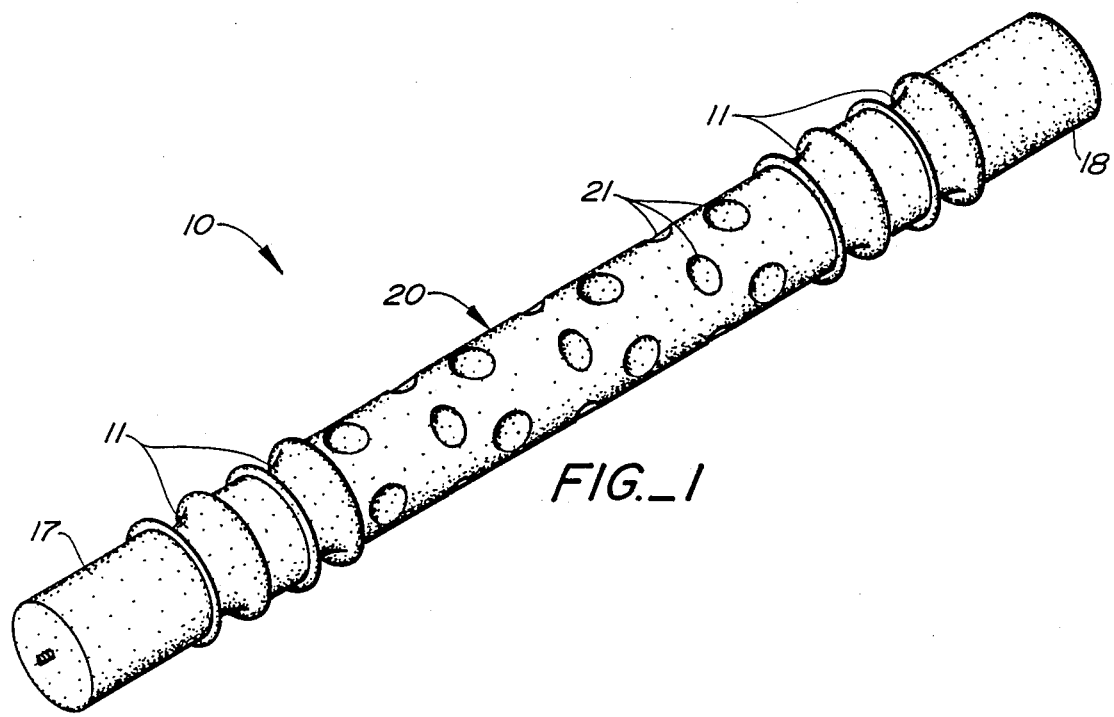
FIG._1
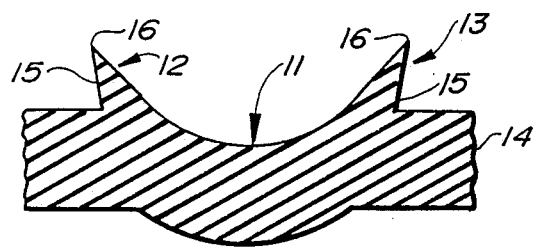
FIG._5
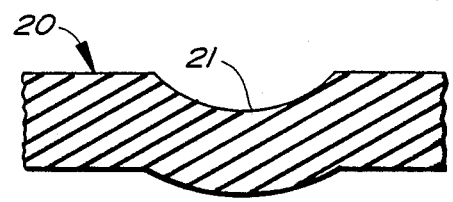
FIG._7
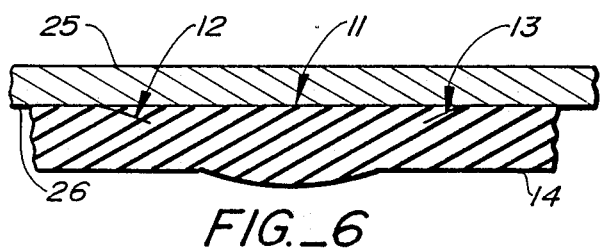
FIG._6
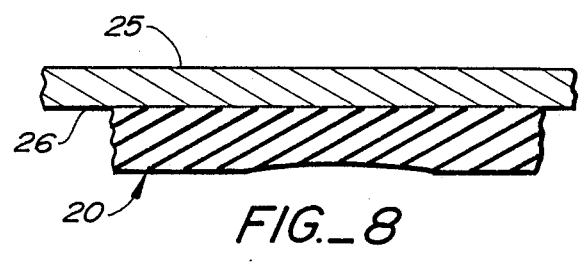
FIG._8

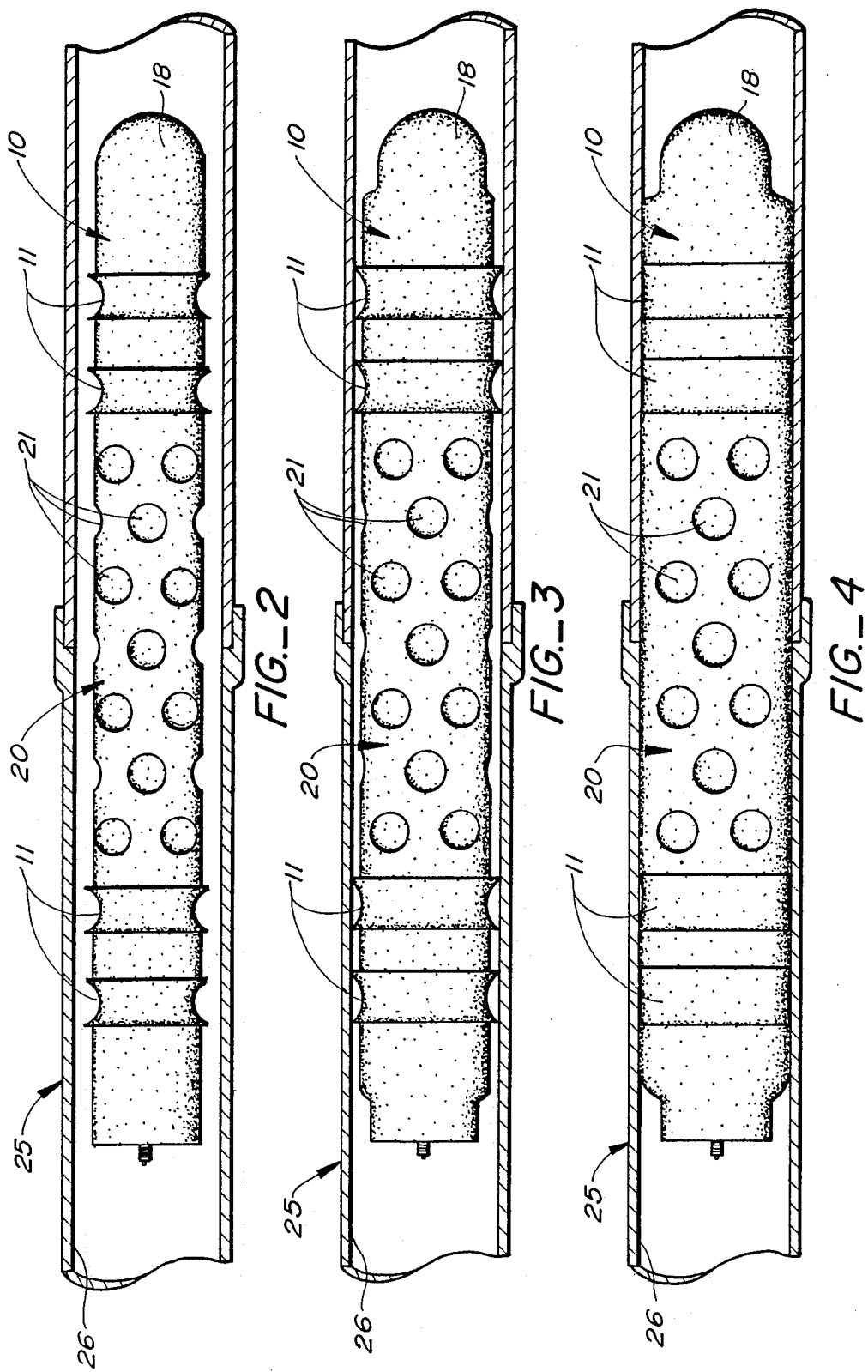

PIPE PLUG WITH CIRCUMFERENTIAL SUCTION CUPS

ALL-RUBBER PLUG FOR SEWER PIPE

This invention relates to an all-rubber plug for sewer pipes, including sewer pipes and water pipes.

BACKGROUND OF THE INVENTION

Sewer pipes at times are plugged, especially in order to perform pneumatic pressure tests. In the construction of residential and commercial buildings it is often necessary to test the gravity sewer lines for their tightness and operability. In order to perform these tests, all ends of the sewer pipe should temporarily be tightly plugged. During the plugging, air under pressure is put into the pipe, and the plug is expected to be able to hold that air pressure. In order to perform such a test, the plug may be inflated. The purpose is to determine whether the pipe does leak. After the test, the plug is removed from the pipe, so that further work can be continued or completed.

Several types of pipe plugging devices have been proposed for testing such pipeline networks as sewer lines.

Currently and historically, a series of rounded ribs have been incorporated on the outer periphery of such a plug, in order to provide a surface that enables the application of pressure of the plug on the inner surface of the host pipe, without causing the plug to move. These rounded ribs have been intended to resist slippage, but in the past the rounded ribs have resisted the slippage only to the extent of being able to hold without slippage a back pressure approximately equal to about 56% of the interior inflation pressure of the plug.

An object of the present invention is to make it possible for the plug to hold pressures equal to the inflation pressure of the plug, without slippage of the plug. These rounded ribs have not had the ability to hold the plug stationary under such pressure. Thus, an object of the present invention is to resist head pressures without slippage for pressures that are higher than would conventionally have been put into the plugs.

Another object of the invention is to provide a novel rib structure and a novel system of circumferential suction rings that improve the ability of the plug to resist head pressures.

SUMMARY OF THE INVENTION

The invention provides long plugs that have at each of two end portions a series of flexible head-pressure-resisting ribs. These ribs, instead of being rounded, are slanted. Shorter plugs and plugs having only one series of ribs are also provided by other forms of the invention.

Between the two end portions of a long plug, the invention may provide a series of dimples or concave members that help the plug to resist head pressure.

The invention thus provides a system for increasing the sealing capacity of the plug.

The hollow plug is purposely made sufficiently smaller than the inner diameter of the pipe so that the plug can be slipped easily into the pipe and slid along to a desired point. Then the plug can be pumped up by a hand pump to provide a tight fit with the sewer pipe wall, by expanding and closing the distance from the plug to the pipe wall. At the same time, the concave ring portions are urged out to provide a shape that hugs the sewer pipe walls, and the angular ribs are swung to provide superior engagement with the pipe wall and with the plug. If the dimples are present, they also are inflated and they come against the pipe wall and provided improved seals there. These seals are more effective than has been possible heretofore in plugs, and they improve the ability of the plug to retain the necessary head pressure.

The major purposes of this invention are to create plugs that have a greater sealing capacity, and also to create a plug that affords a greater safety margin for the operator by resisting "blow out" to a higher degree.

BRIEF DESCRIPTION OF THE DRAWINGS

FIG. 1 is a view in perspective of a pipe plug embodying the principles of the invention.

FIG. 2 is a view in section of a sewer pipe in which a plug of the invention like that of FIG. 1 is being installed. At this stage, the plug is freely movable with respect to the pipe and only partially engages the pipe walls.

FIG. 3 is a similar view of the plug during inflation thereof.

FIG. 4 is a similar view of the plug after inflation when the plug is tightly gripping the pipe walls.

FIG. 5 is an enlarged view in section of a portion of the plug before inflation, showing the initial shape of the concave rings and of its ribs at the ends of each ring.

FIG. 6 is a similar view of a portion of the plug of FIG. 5 during the time after it has been inflated, showing how the concave ring grips the pipe wall and also showing what the ribs then do.

FIG. 7 is a similar view of another portion of the plug and its dimples, showing how they look before inflation.

FIG. 8 is a similar view showing the dimples after inflation when they are expanded and grip the pipe wall.

DESCRIPTION OF A PREFERRED EMBODIMENT

FIG. 1 shows a plug 10 embodying the invention and having a series of concave rings 11 at each end. Each ring 11 lies between and is bounded by a pair of lip-like ribs 12 and 13 that are unusual for this kind of plug. Each rib 12 and 13 is shaped so that it meets a plug body portion 14 at an angle of about 10° and becomes thinner the further out it extends. The ribs 12 and 13 also meet the concave ring portion 11 at about 45° so that each rib 12 and 13 is thicker at its base 15 than at its outer end 16. Each ring 11 lies radially inwardly from the adjacent plug body portion 14. There may be two, three, or more such rings 11 at each plug end-portion 17 or 18. The end portions 17 and 18 need not be identical; they may be different in size, as when one plug is used in the main pipe line and the other in a smaller diameter branch line.

In between the two end-portions 15 and 16 there may be a mid-section 21 which is dimpled by a series of circular dimples 21 that lie next to each other both axially and circumferentially. Each dimple portion 21 is concave and basically circular and when not inflated need not touch the pipe walls.

When the plug 10 is to be used, it is inserted in a sewer pipe 25 to any desired point (see FIG. 2) and then is inflated, as by a hand pump or by pneumatic pressure applied in some other way. At that time it expands (see FIG. 3) and when fully inflated it assumes the shape shown in FIGS. 4, 6 and 8 in which the concave ring portions 11 come snugly against a pipe wall 26 and the rib-like portions 12 and 13 move and engage both the pipe wall 26 and the plug body portions 14. The ribs 12 and 13 are able to do this because they are thin. Similarly, the dimpled portions 21 move outwardly and hug the pipe wall 26. With this system, the fit is very snug indeed and resists head pressure, so that after inflation a pressure equal to the pressure applied for inflation can be held by the plug 10 without the plug moving at all.

For example, the following Tables I and II give some pipe diameter sizes and those of the associated plug with its width, length and weight.

TABLE I

| Part LAR .5 | Pipe Size in mm | | Plug Size in mm | | Width/Length in mm | | Weight | |
|---|---|---|---|---|---|---|---|---|
| | | | | | | | lbs. | kilos |
| 2 | 2 | 50.8 | 1.60 | 25.40 | 6.0 | 165.0 | 0.25 | 0.11 |
| 3 | 3 | 76.0 | 2.50 | 63.50 | 6.0 | 165.0 | 0.50 | 0.22 |
| 4 | 4 | 102.0 | 3.00 | 76.20 | 6.0 | 165.0 | 0.75 | 0.33 |
| 6 | 6 | 152.0 | 4.75 | 120.65 | 6.0 | 165.0 | 2.00 | 0.90 |
| 8 | 8 | 203.0 | 6.75 | 171.45 | 8.7 | 222.0 | 5.00 | 2.25 |
| 10 | 10 | 254.0 | 8.50 | 215.90 | 9.7 | 248.0 | 9.00 | 4.05 |
| 12 | 12 | 305.0 | 10.25 | 260.36 | 12.0 | 318.0 | 13.50 | 6.07 |

TABLE II

| Part LLAR | Pipe Size in mm | | Plug Size in mm | | Width/Length in mm | | Weight | |
|---|---|---|---|---|---|---|---|---|
| | | | | | | | lbs. | kilos |
| 2 | 2 | 50.8 | 1.0 | 38.1 | 17.0 | 438.15 | 0.75 | 0.33 |
| 3 | 3 | 76.2 | 2.0 | 50.8 | 22.5 | 571.50 | 1.00 | 0.45 |
| 4 | 4 | 101.6 | 2.5 | 63.5 | 24.0 | 622.30 | 2.00 | 1.12 |
| 484 | '8" | 101.6 | 3.0 | 88.9 | 28.0 | 711.20 | 3.00 | 1.57 |

Thus, when air is induced into the bladder of the plug 10, pushing the plug's outer surface towards the inner walls 26 of the host pipe 25, the slanted ribs 12 and 13 are pressed against the pipe 25 and against the plug portion 14, forming a total seal at each rib 12 and 13. At the same time, the air in the circumferential semi-circular groove or ring 11 is displaced by the movement of the groove 11 towards the pipe wall 20. This creates a partial vacuum within the area of the groove 11, and the return of the air is prevented by the ribs 12 and 13, either edge of which holds as an area of suction. Additionally the ribs 12 and 13, when subjected to pressure from either end 17 or 18 of the plug 10 tend to raise and add resistance to movement.

During the testing of our new Grip-Rib, there were some interesting results:

1.
   (a) 3" Grip Rib (Long Type) - When set in a 3" aluminum pipe, pressure as high as 100 PSI were reached.
   (b) 3" AR (Long Type) When set in a 3" aluminum pipe, pressure as high as 100 PSI were reached.
   Note: Due to safety reasons, neither plug was inflated to over 100 PSI.
2.
   (a) 3" Grip Rib (Long Type) - When inflating the Grip-Rib to 30 PSI (in a 3" aluminum pipe) it was possible to put 30 PSI in as back pressure. Monitoring both internal plug pressure and back pressure, more pressure was added behind the plug, the internal pressure of the plug rose equally. At approximately 44 PSI behind the plug and the same internally, the plug shot out of the pipe.
   (b) 3" AR (Long Type) - Upon placing the 3" AR (Long Type) in a 3" aluminum pipe the plug was inflated to 30 PSI. While monitoring the internal pressure, back pressure was added. When the back pressure reached approximately 17 PSI the plug shot out of the pipe.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An inflatable pipe plug, comprising
   a tubular all-rubber member having one end closed and an end through which air may be pumped into said tubular member, said member having a tubular end portion,
   said end portion having a series of plug body portions alternating with a series of pairs of flexible inclined ribs that are thin at their outer ends and join a plug body portion at a thicker inner end portion, each pair of ribs having between them a concave expandable ring that normally lies radially within said plug body, each said rib lying at about 10° to its adjoining said body portion so that it faces away from said concave ring,
   whereby when said plug is installed into a pipe, it is freely movable inside said pipe to a desired position and can then be pneumatically expanded so that said concave rings expand and grip the pipe wall surfaces and said thin angular ribs move to grip both the plug and the pipe.

2. An inflatable pipe plug, comprising
   a tubular all-rubber member having one end closed and an end through which air may be pumped into said tubular member, said member having a tubular end portion at each end,
   each said end portion having a series of plug body portions alternating with a series of pairs of flexible inclined ribs that are thin at their outer ends and join a plug body portion at a thicker, inner end portion, each pair of ribs having between them a concave expandable ring that normally lies radially within said plug body, each said rib lying at about 10° to its adjoining said body portion, so that it faces away from said concave ring,
   whereby when said plug is installed into a pipe, it is freely movable inside said pipe to a desired position and can then be pneumatically expanded so that said concave rings expand and grip the pipe wall surface and said thin angular ribs move to grip both the plug and the pipe.

3. An inflatable pipe plug, comprising
   a tubular all-rubber member having one end closed and an end through which air may be pumped into said tubular member, said member having a tubular end portion at each end and a tubular mid-portion between said end portions,
   each said end portion having a series of plug body portions alternating with a series of pairs of flexible inclined ribs that are thin at their outer ends and join a plug body portion at a thicker, inner end portion, each pair of ribs having between them a concave expandable ring that normally lies radially within said plug body, each said rib lying at about 10° to its adjoining said body portion, so that it faces away from said concave ring, said mid-portion having a series of circular concave dimples next to each other both axially and circumferentially, whereby when said plug is installed into a pipe, it is freely movable inside said pipe to a desired position and can then be pneumatically expanded so that said concave rings expand and grip the pipe wall surfaces and said thin angular ribs move to grip both the plug and the pipe and said dimples likewise expand and grip said pipe.

4. A method of plugging a pipe with an inflatable plug, having a tubular all-rubber member with one end closed and an end through which air may be pumped into said tubular member, said member having a tubular end portion with a series of plug body portions alternating with a series of pairs of flexible inclined ribs that are thin at their outer ends and join a plug body portion at a thicker inner end portion, each pair of ribs having between them a concave expandable ring that normally lies radially within said plug body, each said rib lying at about 10° to its adjoining said body portion so that it faces away from said concave ring, comprising installing said plug into a pipe, while it is freely movable inside said pipe to a desired position, then pneumatically expanding said plug so that said concave rings expand and grip the pipe wall surfaces and so that said thin angular ribs move to grip both the plug and the pipe.

5. A method of plugging a pipe with an inflatable plug, having a tubular all-rubber member with one end closed and an end through which air may be pumped into said tubular member, said member having a tubular end portion at each end with a series of plug body portions alternating with a series of pairs of flexible inclined ribs that are thin at their outer ends and join a plug body portion at a thicker, inner end portion, each pair of ribs having between them a concave expandable ring that normally lies radially within said plug body, each said rib lying at about 10° to its adjoining said body portion, so that it faces away from said concave ring, comprising installing said plug into a pipe, by freely moving it inside said pipe to a desired position, then pneumatically expanding so that said concave rings expand and grip the pipe wall surfaces and said thin angular ribs move to grip both the plug and the pipe.

6. A method of plugging a pipe with an inflatable plug that has a tubular all-rubber member having one end closed and an end through which air may be pumped into said tubular member, said member having a tubular end portion at each end and a tubular mid-portion between said end portions, each said end portion having a series of plug body portions alternating with a series of pairs of flexible inclined ribs that are thin at their outer ends and join a plug body portion at a thicker, inner end portion, each pair of ribs having between them a concave expandable ring that normally lies radially within said plug body, each said rib lying at about 10° to its adjoining said body portion, so that it faces away from said concave ring, said mid-portion having a series of circular concave dimples next to each other both axially and circumferentially, comprising installing said plug into a pipe, by freely moving it inside said pipe to a desired position, then by pneumatically expanding said plug so that said concave rings expand and grip the pipe wall surfaces and said thin angular ribs move to grip both the plug and the pipe and said dimples likewise expand and grip said pipe.

* * * * *